United States Patent

[11] 3,557,310

[72] Inventors Anthony J. Presti
Warren;
Lawrence G. Kersta, Neshanic Station, N.J.
[21] Appl. No. 742,298
[22] Filed July 3, 1968
[45] Patented Jan. 19, 1971
[73] Assignee Farrington Manufacturing Company
New York, N.Y.
a corporation of Massachusetts

[54] SPEECH RECOGNIZER
10 Claims, 2 Drawing Figs.

[52] U.S. Cl. 179/1
[51] Int. Cl. G10l 1/08
[50] Field of Search 179/1AS, 1ASM

[56] References Cited
UNITED STATES PATENTS
3,188,388 6/1965 Clapper 179/1

*Primary Examiner*—Kathleen H. Claffy
*Assistant Examiner*—Douglas W. Olms
*Attorney*—Gerald J. Ferguson, Jr.

ABSTRACT: Speech recognition equipment is disclosed which distinguishes the sounds "OH" and "ONE" (respectively corresponding to the numerals 0 and 1). The recognition equipment takes advantage of the fact that the characteristic frequency of the second formant of "OH" increases with the time while the characteristic frequency of the corresponding formant of ONE decreases with respect to time. The sound to be recognized is fed to a frequency discriminator after a test has been made to distinguish the sound from background noise. The discriminator output is applied to two sampling circuits, one of which samples the discriminator output signal shortly after the presence of the sound is detected and the second of which samples the signal shortly after the first sample is taken. The samples are held in capacitive storage means. After both samples have been taken, the outputs of the capacitors are applied to a subtractor. Thus, the polarity output of the signal from the subtractor indicates whether the sound was "OH" or "ONE."

PATENTED JAN 19 1971 3,557,310

INVENTORS
LAWRENCE G. KERSTA
ANTHONY J. PRESTI
By Gerald J. Ferguson, Jr.
ATTORNEY

SPEECH RECOGNIZER

BACKGROUND OF THE INVENTION

This invention relates to speech recognition equipment and in particular to speech recognition equipment which distinguishes between the sounds OH and ONE.

There are many situations where speech recognizers are employed. For example, voice-actuated typewriters have been proposed. Such apparatus normally requires a quite sophisticated recognizer to distinguish the various sounds or words comprising the large vocabulary associated therewith.

In many applications the vocabulary to be recognized may be significantly simplified by coding the constituent words. Thus, for example, a five bit binary code could be employed to represent 32 words of a vocabulary. Thus, the numeral 9 would be represented by the five bit binary code 01001. In speaking the number 9, the person would say OH-ONE-OH-OH-ONE. It can be seen that the task of the speech recognizer is materially simplified inasmuch as only the sounds OH and ONE have to be distinguished. Without the coding, the recognizer must distinguish the sound NINE from the other decimal digits. This, of course, complicates the recognition task.

Further, in commercial transactions, for example, a series of zero's and one's might be printed or employed on a credit card, the various combinations of zero's and one's distinguishing one card holder from another. The zero's and one's could be read into a speech recognizer, the output of which would be applied to an appropriate apparatus for ascertaining the identification of the card holder and performing other appropriate checks.

SUMMARY OF THE INVENTION

It is thus an object of this invention to provide speech recognition equipment for distinguishing between the sounds OH and ONE.

It is a further object of this invention to provide improved equipment of the above type which distinguishes one sound from another by detecting whether the frequency of a particular formant is increasing or decreasing with respect to time.

It is a further object of this invention to provide improved speech recognition equipment which is adapted for use with binary coded representations of information.

Other objects and advantages of this invention will become apparent upon reading the appended claims in conjunction with the following detailed description and the attached drawing.

DETAILED DESCRIPTION OF A PREFERRED EMBODIMENT OF THE INVENTION

Figures 1, 2:
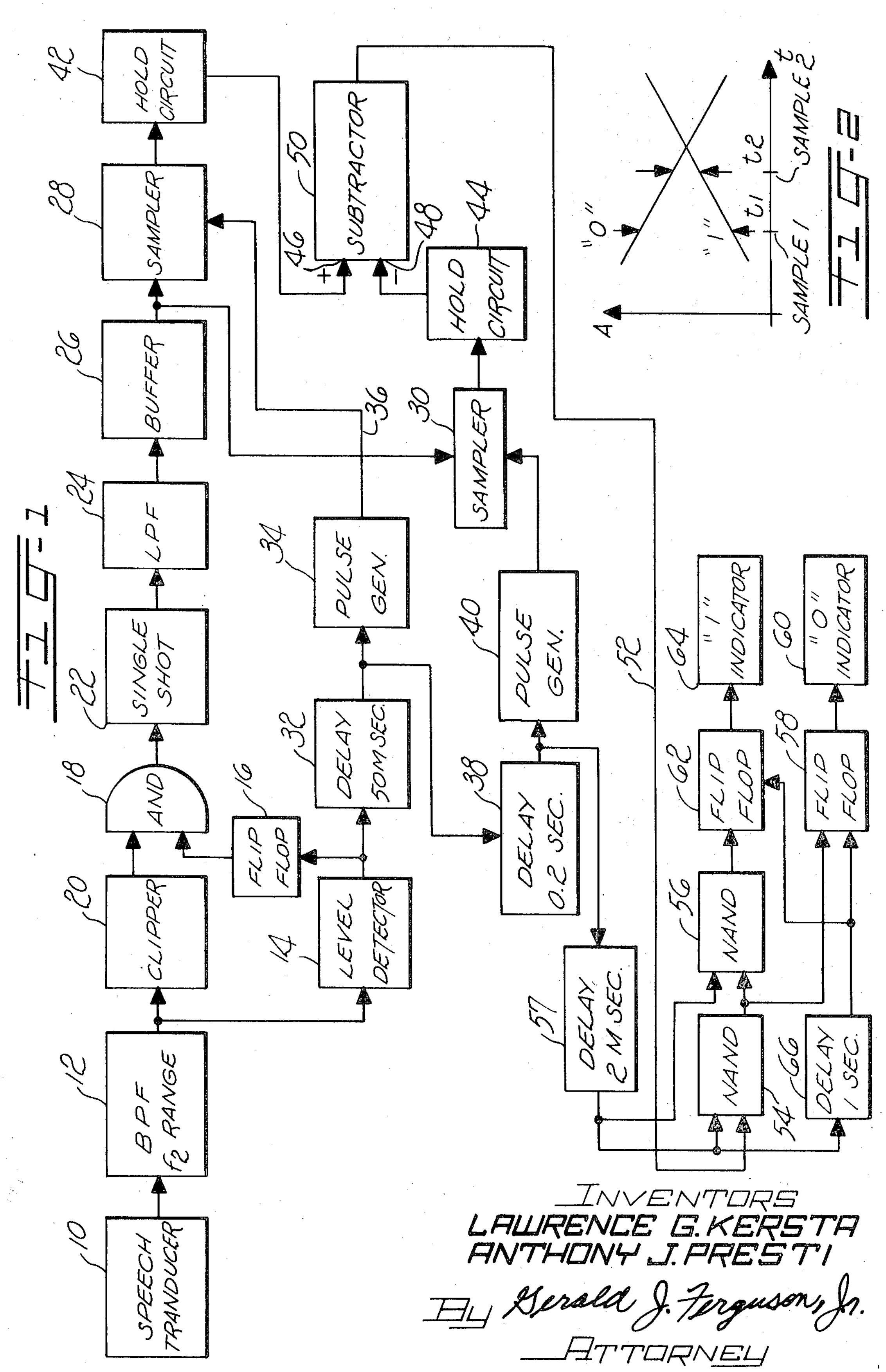
FIG. 1 is a block diagram of an illustrative embodiment of the invention.
FIG. 2 is a graph illustrating the operation of the invention.

Referring to FIG. 1, there is shown a block diagram of a preferred embodiment of the invention. Speech transducer 10 is responsive to speech sounds and in the particular embodiment described hereinafter, it is in particular responsive to the sounds OH (corresponding to the numeral 0) and ONE (corresponding to the numeral 1). Further, although this invention is particularly advantageous in that it provides a simple apparatus for distinguishing the binary code bits OH and ONE, it is to be understood that the principles of this invention may be extended to the discrimination between other sounds other than OH and ONE. The transducer 10 converts the sound waves applied thereto to appropriate electrical signals, which in turn are applied to band pass filter 12. The band pass of filter 12 is such that it passes only the second formant of the sounds OH and ONE, each of these formants occurring in the range extending from 600 to 1500 hz.

The filter output is applied to level detector 14, which includes a threshold which corresponds to the presence of bona fide speech sounds. Thus, ambient noise entering the system normally will not exceed the threshold of detector 14 and thus, the system will not be activated. However, the occurrence of either of the speech sounds OH or ONE will generate a signal filter 12 of sufficient amplitude so as to exceed the threshold of detector 14 at which time an output pulse is generated therefrom. This pulse is applied to a flip-flop 16 which conditions AND gate 18.

The output from filter 12 is also applied to infinite clipper 20 which converts the analogue output signal from filter 12 to a train of pulses. With AND gate 18 conditioned, as before described, the pulse train is applied to single shot 22, which produces another pulse train, the width of the pulses being constant and the frequency thereof corresponding to the frequency of the pulse train applied to the single shot. The single shot output is applied to a low pass filter 24, the time constant of which is typically 20 milliseconds. The filter 24 acts as a frequency discriminator in that the amplitude of the output signal therefrom is directly proportional to the frequency of the input pulse train applied thereto. The amplitude varying output signal from the filter 24 is applied to buffer 26.

The buffer 26 output signal is applied to samplers 28 and 30. The input to sampler 28 is sampled prior to the sampling of the input sampler 30. This is accomplished by delays 32 and 38. The pulse output from level detector 14 is applied to delay 32 and thence through pulse generator 34 to sampler 28 over line 36. The output from delay 32 is also applied to delay 38 and thence through pulse generator 40 to sampler 30. The amount of delay introduced by delay 32 is typically 50 milliseconds and is so chosen so as to insure that the sample pulse applied over line 36 to sampler 28 is delayed by a length of time exceeding the time constant of low pass filter 24. The delay introduced by delay 38 is so chosen as to insure that the sampling pulse applied to sampler 30 does not occur after the sound has stopped. Typically, the delays 32 and 38 and pulse generators 34 and 40 are monostable multivibrators. The output signals from samplers 28 and 30 are respectively applied to circuits 42 and 44, each of which may be capacitors, the time constant associated therewith being such as to hold their respective samples over at least the length of the sound. The outputs from the hold circuits 42 and 44 are respectively applied to terminals 46 and 48 of subtractor 50, the signal occurring at terminal 48 being subtracted from that occurring at terminal 46.

As will become more apparent hereinafter the polarity of the output signal from subtractor 50 indicates whether the speech sound applied to transducer 10 was OH or ONE. The output signal from subtractor 50 is applied over line 52 to appropriate polarity sensing circuitry comprising NAND circuits 54 and 56. The output signal from subtractor 50 is applied to NAND circuit 54 and the output therefrom is applied to NAND circuit 56. The output from delay 38 is also connected to delay 57, the output of which is also connected to the inputs of NAND circuits 54 and 56. The output from delay 57 is typically a positive going pulse and thus, if the output from subtractor 50 is positive also, flip-flop 58 is switched on to thereby energize O indicator 60. However, if the output from subtractor 50 is negative, the output from NAND circuit 56 turns flip-flop 62 on and thereby energizes 1 indicator 64. Delay 66 is also connected to the output of delay 57 to reset the flip-flops 58 and 62. The output of delay 66 may also be used to reset flip-flop 16. Typical delays are indicated for each of the delay blocks shown in FIG. 2. It is to be understood that these values are for purposes of illustration only.

The operation of the circuitry of FIG. 1 is as follows: Referring to FIG. 2 there is shown a graph illustrating how the circuitry of FIG. 1 functions to perform the discriminating function between the sounds OH and ONE. Assume that the sound OH is applied to the transducer 10. The frequency of the second formant of the sound OH decreases with time. Thus, the frequency of the signal passed by filter 12 will accordingly decrease with time. This signal will exceed the threshold established at level detector 14 and thus set flip-flop 16 which in turn will apply a gating signal to AND circuit 18. The filter output signal is simultaneously clipped by clipper 20 and applied through AND circuit 18 to single shot 22. The frequency of the pulse train applied to low pass filter 24 will decrease with time and thus the amplitude of the filter output signal will also decrease with time as indicated for the curve marked O in FIG. 2. The filter output signal is then applied through buffer 26 to samplers 28 and 30.

The pulse generated by level detector 14 is also applied through delay 32 and pulse generator 34 over line 36 to sample the input to sampler 28 at time $t_1$ as indicated in FIG. 2. The sample is applied to hold circuit 42 which maintains the amplitude of the sample signal at the output thereof. The output from delay 34 is also applied through delay 38 and pulse generator 40 to sampler 30 to sample the buffer 26 output at time $t_2$. As can be seen in FIG. 2 the buffer output will be less in amplitude at time $t_2$ than it was at time $t_1$. Thus, the amplitude of the signal appearing at terminal 48 will be less than that appearing at terminal 46 and hence the polarity of the subtractor output signal will be positive. This positive polarity is sensed when a gating pulse occurs at the output of delay 57 in the manner described hereinbefore. Thus, the indicator 60 will be energized to indicate that the sound presented to the speech recognizer equipment of FIG. 1 was a 0.

From the foregoing, it is clear that the output from subtractor 50 will be of negative polarity whenever the speech sound ONE is applied to the transducer 10. This follows, as can be seen in FIG. 2, from the fact that the buffer output signal will be greater in amplitude at time $t_2$ than at time $t_1$. Thus, the signal at terminal 46 of subtractor 50 will be less in amplitude than the signal at terminal 48. Thus, the 1 indicator 64 will be energized in the manner described hereinbefore.

Numerous modifications of the invention will become apparent to one of ordinary skill in the art upon reading the foregoing disclosure. During such a reading it will be evident that this invention provides unique speech recognition equipment for accomplishing the objects and advantages herein stated. Still other objects and advantages and even further modifications will become apparent from this disclosure. It is to be understood, however, that the foregoing disclosure is to be considered exemplary and not limitative, the scope of the invention being defined by the following claims.

We claim:

1. Speech recognition equipment for distinguishing between two sounds, one of the formants of one of the sounds having a characteristic frequency which increases with time and the other sound having a formant which has a characteristic frequency which decreases with time, said equipment comprising:

transducer means responsive to either one of said two sounds for converting said one sound to an electrical signal;

filter means for separating from said electrical signal one of said formants;

sensing means for determining whether the characteristic frequency of said separated formant increases or decreases with respect to time; and whereby said one sound may be recognized.

2. Equipment as in claim 1 where said sensing means includes converting means responsive to said separated formant for converting it to an amplitude varying signal, the amplitude of which is proportional to the frequency of the separated formant and means for determining whether the amplitude of said amplitude varying signal increases or decreases with time to thereby perform the desired recognition function.

3. Equipment as in claim 2 where said means for determining whether the amplitude of said amplitude varying signal is increasing or decreasing includes:

two sampling means, both of which are responsive to said amplitude varying signal;

means for generating two sampling signals successively in time and respectively applying these to said two sampling means so that the first of said two sampling means produces a first sample of said amplitude varying signal at time $t_1$ and the second of said two sampling means produces a second sample of said amplitude varying signal at a later time $t_2$; and means for subtracting the two sample signals from one another whereby the polarity of the output signal from the subtracting means is indicative of whether the amplitude of said amplitude varying signal increases or decreases with respect to time.

4. Equipment as in claim 3 including means responsive to said filter means for distinguishing said two sounds from background noise.

5. Equipment as in claim 4 including means for sensing the polarity of the output signal from said subtracting means.

6. Equipment as in claim 1 where said two sounds respectively are OH and ONE.

7. Equipment as in claim 6 where said filter means separates the second formants of the sounds OH and ONE.

8. Apparatus as in claim 7 where said filter means includes a band pass filter the frequency range of which extends from 600 to 1500 hz.

9. Equipment as in claim 5 where said converting means includes low pass filter means.

10. Equipment as in claim 9 where time $t_1$ is a time greater than the time constant of said low pass filter means.